(No Model.)
C. LEE.
HORSE CHECK.
No. 564,330. Patented July 21, 1896.
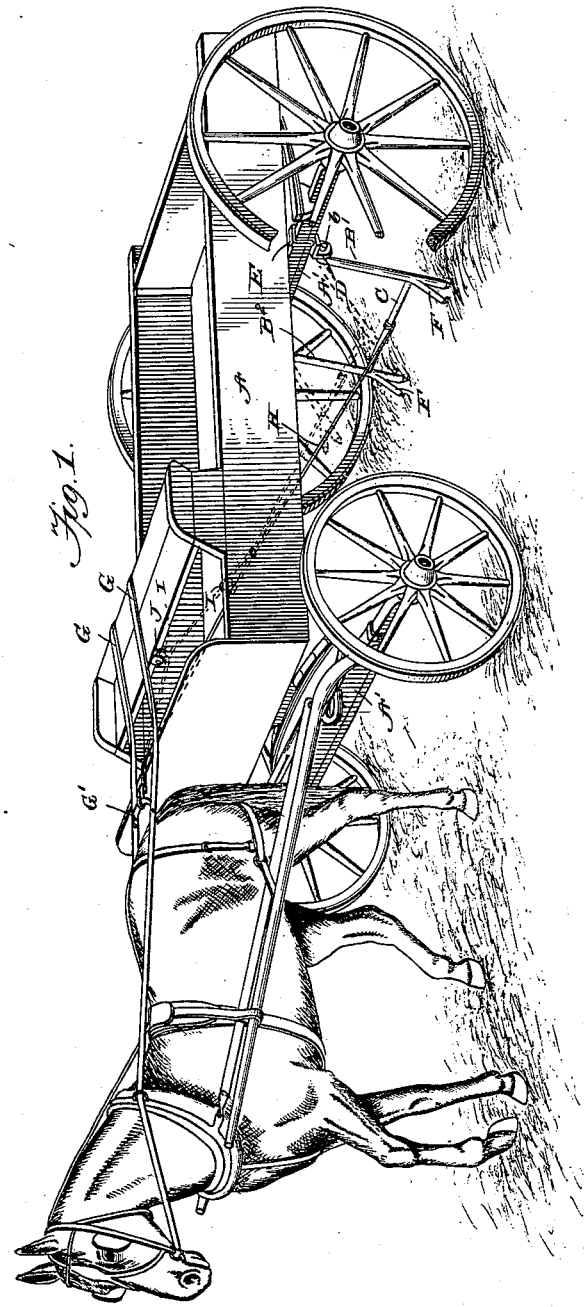
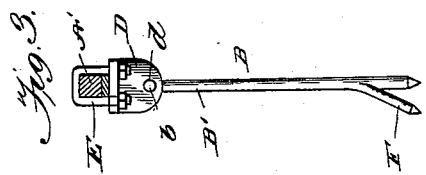
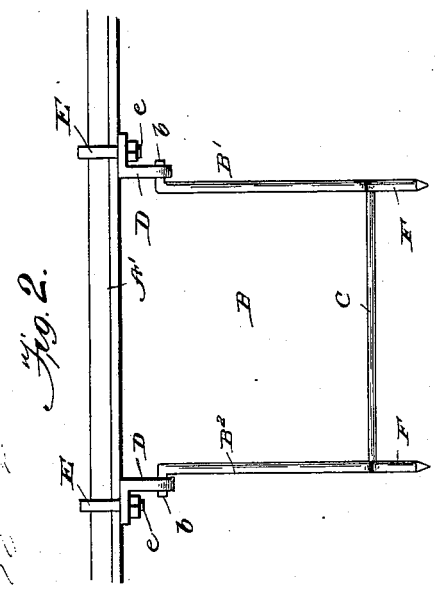
Witnesses
John C. Shaw
R. M. Smith
Inventor
Charles Lee,
By his Attorney
C A Snow & Co.

UNITED STATES PATENT OFFICE.

CHARLES LEE, OF SAN ANTONIO, TEXAS.

HORSE-CHECK.

SPECIFICATION forming part of Letters Patent No. 564,330, dated July 21, 1896.

Application filed March 12, 1895. Serial No. 541,493. (No model.)

*To all whom it may concern:*

Be it known that I, CHARLES LEE, a subject of the Queen of Great Britain, residing at San Antonio, in the county of Bexar and State of Texas, have invented a new and useful Horse-Check, of which the following is a specification.

My invention relates to devices for checking horses when, in the absence of the driver or other attendant, the horse becomes frightened or restless and starts off.

The object of my invention is to make an automatic check which, used in connection the lines or reins, shall be operated by the forward movement of the vehicle to which the horse is attached, to pull back with considerable force upon said lines or reins, and prevent the horse from walking or running off.

It consists in providing one of the axles of a vehicle with a swinging frame, pivotally attached thereto and projecting downward, and adapted to rest upon the ground and engage the same when the vehicle moves forward, thereby operating upon a pull rope, cord, or cable, connected with the lines or reins, and causing the latter to be drawn back with considerable force and to check the animal; in the manner of folding up the device and securing it when not in use, and in certain other details of construction and arrangement of parts hereinafter described and claimed.

In the accompanying drawings, Figure 1 is a perspective view of a wagon and horse, illustrating the manner in which my checking device operates. Fig. 2 is a rear elevation of the swinging frame, showing the manner of its attachment to the axle of the vehicle. Fig. 3 is an edge view of the same, looking from one side of the vehicle.

Similar letters of reference indicate corresponding parts in all the figures of the drawings.

A represents a vehicle, and A' A' the axles thereof. B indicates the swinging frame of my invention. This frame is composed entirely of metal, and has two side bars B' and $B^2$, of a length about equal to or slightly greater than the radius of the rear wheels, to the axle of which the device is adapted to be applied.

C represents a cross-bar interposed between and connecting the side bars B'. The bars B' $B^2$, at their upper ends, are bent outward to form pivots $b$ $b$, adapted to engage suitable angle-irons pendent from the axle A'.

D D represent angle-irons, which have perforations $d$ for the reception of the pivots $b$, just described. The pendent angle-irons D are secured to the axle A' by means of suitable clips E E and bolts and nuts $e$, in the usual manner of securing attachments to the axles and vehicles. The arms B and B' may be pointed at their lower ends, so as to penetrate the ground when the weight of a vehicle is thrown thereon. I prefer also to provide the arms B and B' with additional or supplemental arms or projecting points F F. (Shown in Fig. 1.)

G G indicate the lines or reins of the animal, and G' a short strap interposed between and connecting the two parts thereof.

H is a pull cord, rope, or cable of flexible wire attached to the cross-bar C of the swinging frame, at or near the center thereof. The other end of the cord or cable H is provided with a spring clip or hook, which engages the strap G', attached to the reins or lines.

The cord or cable H may pass through the perforation in the bottom flooring of the vehicle, or pass through an eye at the front of the vehicle, and thence, beneath the body of the vehicle, to the bar C. In either case the cord or cable H is provided with a suitable stop in the form, preferably, of a metal ring I, though any other form of stop may be employed. The purpose of this stop I is to limit the backward movement of the cord or cable H, thereby limiting the backward movement of the swinging frame D, D', and C and throwing a large portion of the weight of the vehicle upon said frame, thereby rendering it necessary for the horse to drag the entire weight of the vehicle when he moves off.

J indicates a button, hook, or other suitable support adapted to engage the ring I on the cord or cable H when it is desired to lift the swinging frame out of contact with the ground and cause the swinging frame to occupy the position shown in dotted lines in Fig. 1.

It will be seen that the check above described is automatic in action, constructed in a simple manner, and therefore not liable to get out of order, and that it is quickly and easily adjusted.

Various changes in the form, proportion, and the minor details of construction may be resorted to without departing from the spirit or sacrificing any of the advantages of this invention.

Having thus described my invention, I claim.

1. A rigid rectangular frame pivotally suspended on a fixed fulcrum beneath a vehicle and having its side bars substantially parallel and rigidly connected and formed to engage with the ground as the vehicle moves forward, in combination with a cord or cable connected at one end to said pivoted frame and at its opposite end to the reins and adapted to be operated by said frame, and a ring secured to said cord or cable between its point of connection with said pivoted frame and the point where it connects with the reins, said ring being adapted to be engaged with a projection on the wagon for the purpose of limiting the backward movement of said frame, substantially as and for the purpose described.

2. In a horse-check, a frame pivotally suspended beneath a vehicle and comprising an oppositely-disposed pair of side bars having their lower ends bifurcated and formed with forwardly-inclining extensions to engage with the ground, and a bar rigidly connecting said side arms adjacent to their lower ends, in combination with a cord or cable connected at one end to the said pivoted frame and at its opposite end to the reins, substantially in the manner and for the purpose specified.

3. The herein-described horse-check, comprising a swinging arm suspended beneath a vehicle-body and formed to engage the ground, and a branch or extension of said arm projecting in advance thereof and also formed to engage the ground, as specified.

In testimony that I claim the foregoing as my own I have hereto affixed my signature in the presence of two witnesses.

CHARLES LEE.

Witnesses:
BEN. S. FISK,
GEO. G. LESTER.